United States Patent
Chetlur et al.

(10) Patent No.: US 11,340,763 B2
(45) Date of Patent: May 24, 2022

(54) NON-LINEAR NAVIGATION OF VIDEOS

(71) Applicant: INTERNATIONAL BUSINESS MACHINES CORPORATION, Armonk, NY (US)

(72) Inventors: Malolan Chetlur, Bangalore (IN); Danish Contractor, Gurgaon (IN); Bikram Sengupta, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 214 days.

(21) Appl. No.: 15/823,875

(22) Filed: Nov. 28, 2017

(65) Prior Publication Data

US 2019/0163332 A1    May 30, 2019

(51) Int. Cl.
| | | |
|---|---|---|
| *G06F 3/0484* | (2022.01) | |
| *H04L 67/50* | (2022.01) | |
| *G06F 9/451* | (2018.01) | |
| *G06F 3/01* | (2006.01) | |
| *H04L 67/306* | (2022.01) | |

(52) U.S. Cl.
CPC ............ *G06F 3/0484* (2013.01); *G06F 9/451* (2018.02); *H04L 67/22* (2013.01); *G06F 3/013* (2013.01); *H04L 67/306* (2013.01)

(58) Field of Classification Search
CPC ........ G06F 3/0484; G06F 3/013; G06F 9/451; G06F 3/0483; H04L 67/22; H04L 67/306; G09B 7/00; G09B 5/06; G09B 5/00
See application file for complete search history.

(56) References Cited

U.S. PATENT DOCUMENTS

| | | | |
|---|---|---|---|
| 6,877,134 B1* | 4/2005 | Fuller | G06F 16/58 715/202 |
| 8,873,930 B2 | 10/2014 | Deglise et al. | |
| 9,055,352 B2 | 6/2015 | Wallis et al. | |
| 9,407,892 B2 | 8/2016 | Mo et al. | |
| 2004/0098362 A1* | 5/2004 | Gargi | G06F 16/51 |

(Continued)

OTHER PUBLICATIONS

Yadav et al., "Towards Supporting Non-linear Navigation in Educational Videos", ICMI'14, Nov. 12-16, 2014, pp. 82-83.

(Continued)

*Primary Examiner* — Andrew R Dyer
*Assistant Examiner* — Bille M Dahir
(74) *Attorney, Agent, or Firm* — John Noh (57) ABSTRACT

An embodiment of the invention may include a method, computer program product and computer system for non-linear video navigation. The method, computer program product and computer system may include a computing device that collects source content and source content metadata from a content device. The computing device may extract the metadata from the source content and store the source content and the metadata on a server. The computing device may receive user profile data from a user device. The computing device may map the semantic data of the source content, the metadata, and the user profile data to a knowledge graph. The computing device may create navigational panels for navigating the source content based on the knowledge graph, the navigational panels enabling non-linear navigation of the source content by a user. The computing device may provide the navigational panels to the user device.

20 Claims, 7 Drawing Sheets

(56) References Cited

U.S. PATENT DOCUMENTS

| | | | | |
|---|---|---|---|---|
| 2012/0064500 | A1* | 3/2012 | Waitzkin | G09B 5/06 |
| | | | | 434/350 |
| 2012/0083312 | A1* | 4/2012 | Kim | G02B 13/001 |
| | | | | 455/556.1 |
| 2013/0093835 | A1* | 4/2013 | Paithankar | H04N 7/152 |
| | | | | 348/14.07 |
| 2014/0272889 | A1* | 9/2014 | Kulkarni | G09B 5/08 |
| | | | | 434/350 |
| 2015/0037002 | A1 | 2/2015 | Fastige | |
| 2015/0063781 | A1* | 3/2015 | Silverman | H04N 21/4126 |
| | | | | 386/241 |
| 2015/0254214 | A1* | 9/2015 | Rosenberg | G09B 7/08 |
| | | | | 715/202 |
| 2016/0358487 | A1* | 12/2016 | Bilic | G09B 5/00 |
| 2017/0262433 | A1* | 9/2017 | Chester | G06N 7/005 |
| 2019/0095446 | A1* | 3/2019 | Laeuchli | G06F 16/44 |
| 2020/0174630 | A1* | 6/2020 | Rosenberg | G06F 3/04855 |

OTHER PUBLICATIONS

Yadav et al., "Content-driven Multi-modal Techniques for Non-linear Video Navigation", IUI 2015 • Visualization / Video / Augmented Reality, Mar. 29-Apr. 1, 2015, pp. 333-344.

Yadav et al., "ViZig: Anchor Points based Navigation and Summarization in Educational Videos", IUI 2016 • IUI for Education and Training, Mar. 7-10, 2016, pp. 407-418.

Mell et al., "The NIST Definition of Cloud Computing", Recommendations of the National Institute of Standards and Technology, Special Publication 800-145, Sep. 2011, 7 pages.

* cited by examiner

NON-LINEAR NAVIGATION OF VIDEOS

BACKGROUND

The present invention relates generally to a method, system, and computer program for non-linear navigation of video content. More particularly, the present invention relates to a method, system, and computer program for navigating video sub-content based on a user's proficiency, content presentation styles and content concept categories.

Education has become increasingly digital with classes being offered via video instead of through live classes. Such educational videos may be presented live or may be recorded and stored on a remote server and accessed by a user via a network. Educational videos allow users to attend classes on their own time and thus expand a user's opportunities beyond what was available to them via traditional live classes. Educational videos may contain content which the user already knows or has already seen and a user may not be able to efficiently navigate through the video to point of interest.

For example, a user may want to go back and re-watch portions of an educational video, which may be difficult as the user would need to fast forward and rewind through the video to find the user's desired content. Such rigid linearity of educational videos restricts users' ability to efficiently navigate through the video for desired content and provides a less than desirable educational source.

BRIEF SUMMARY

Non-linear video navigation is a process that allows a user to navigate video content in a personalized order. Non-linear video navigation thus enables a user to view specific parts within video content in any order that is suitable to a user's needs.

An embodiment of the invention may include a method, computer program product and computer system for non-linear video navigation. The method, computer program product and computer system may include a computing device that collects source content and source content metadata from at least one content device by a server communicating with the content device by a communication network. The computing device may extract the metadata from the source content and store the source content and the metadata on the server. The computing device may receive user profile data from at least one user device connected the server by a communication network. The computing device may map the semantic data of the source content, the metadata of the source content, and the user profile data to a knowledge graph. The computing device may create navigational panels for navigating the source content based on the knowledge graph, the navigational panels enabling non-linear navigation of the source content by a user. The computing device may provide the navigational panels to the user device by the server for navigation by the user. The computing device may monitor the user's interaction with the navigational panels on the user device and update the knowledge graph and user profile data with the user's interaction with the navigational panels and progression through the source content.

BRIEF DESCRIPTION OF THE DRAWINGS

The above and other aspects, features, and advantages of certain exemplary embodiments of the present invention will be more apparent from the following description taken in conjunction with the accompanying drawings, as described below.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Figure 1:
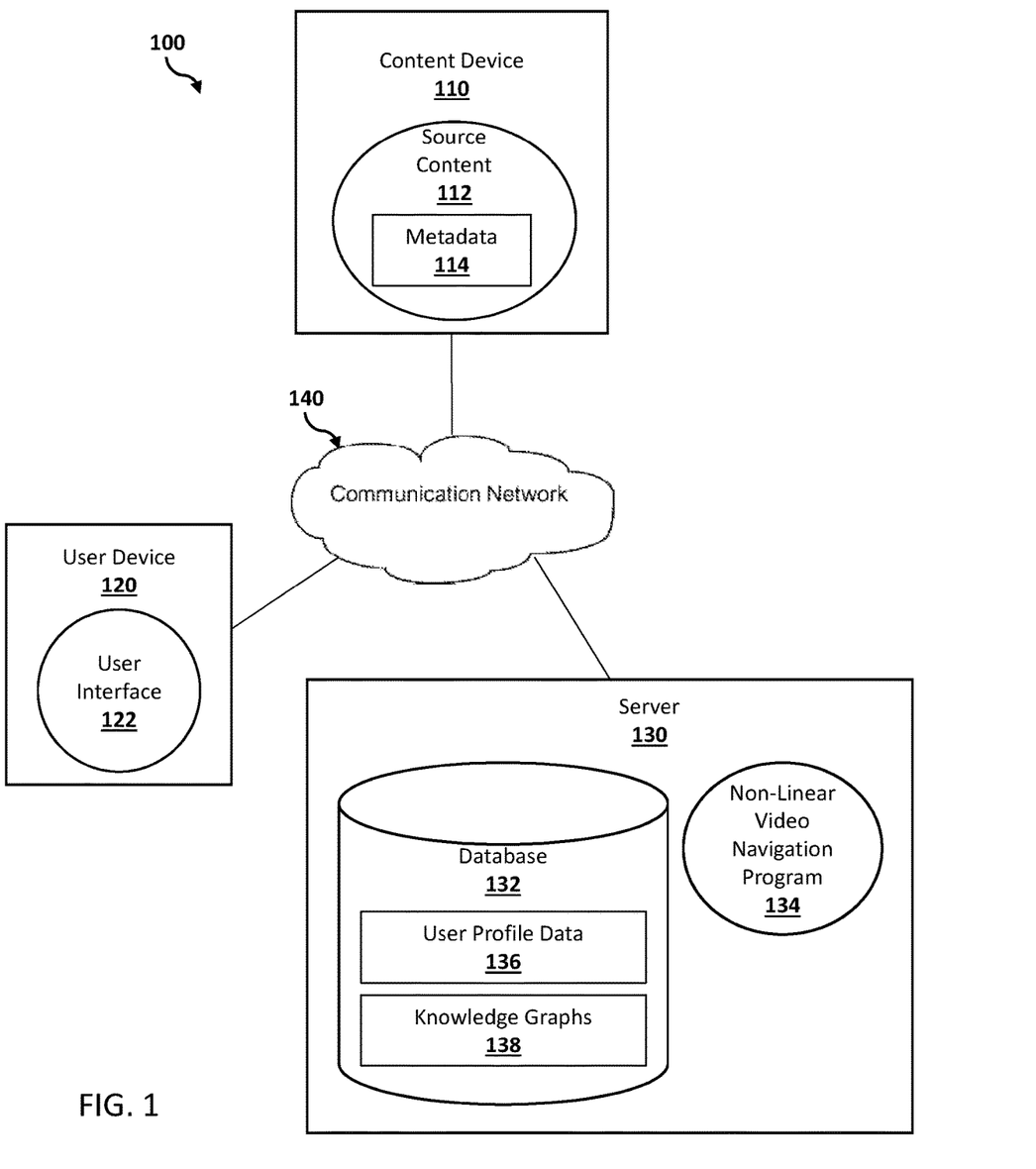
FIG. 1 is a block diagram which illustrates a system for non-linear navigation of videos, in accordance with an embodiment of the invention.

FIG. 1 illustrates a non-linear video navigation system 100, in accordance with an embodiment of the invention. In an example embodiment, non-linear video navigation system 100 includes a content device 110, a user device 120, and a server 130 interconnected via a network 140.

In the example embodiment, the network 140 is embodied as the Internet, representing a worldwide collection of networks and gateways to support communications between devices connected to the Internet. The network 140 may include, for example, wired, wireless or fiber optic connections. In other embodiments, network 140 may be implemented as an intranet, a local area network (LAN), or a wide area network (WAN). In general, network 140 can be any combination of connections and protocols that will support communications between content device 110, user device 120, and server 130.

Content device 110 may contain source content 112. Content device 110 may be a desktop computer, a notebook, a laptop computer, a tablet computer, a handheld device, a smart-phone, a thin client, or any other electronic device or computing system capable of storing audio, visual, or textual content and receiving and sending that content to and from other computing devices such as user device 120 and server 130 via network 140. In some embodiments, content device 110 includes a collection of devices, or data sources, in order to collect audiovisual content. Content device 110 is described in more detail with reference to FIG. 4.

Source content 112 is a collection of audiovisual content including, but not limited to, audio, visual, and textual content. Source content 112 may be, for example, educational videos, training videos, movies, and presentations, etc. Source content 112 is located on content device 110 that can be accessed via network 140. In accordance with an embodiment of the invention, source content 112 may be located on one or a plurality of content devices 110.

User device 120 may include user interface 122, for example, a graphical user interface. User device 120 may be a desktop computer, a notebook, a laptop computer, a tablet computer, a handheld device, a smart-phone, a cellular phone, a landline phone, a thin client, or any other electronic device, computing system, wired or wireless device capable of receiving and sending content to and from other computing devices, such as content device 110, and server 130, via network 140. User device 120 is described in more detail with reference to FIG. 4.

User interface 122 includes components used to receive input from a user and transmit the input to non-linear video navigation program 134 residing on server 130, or conversely to receive information from non-linear video navigation program 134 and display the information to the user. In an example embodiment, user interface 122 uses a combination of technologies and devices, such as device drivers, to provide a platform to enable users of user device 120 to interact with non-linear video navigation program 134. In the example embodiment, user interface 122 receives input, such as textual input received from a physical input device, such as a keyboard. In another embodiment, user interface 122 may receive input via tracking ocular movement of a user.

Server 130 includes non-linear video navigation program 134 and database 132. In the example embodiment, Server 130 may be a desktop computer, a notebook, a laptop computer, a tablet computer, a thin client, or any other electronic device or computing system capable of storing compiling and organizing audio, visual, or textual content and receiving and sending that content to and from other computing devices, such as content device 110 and user device 120, via network 140. Server 130 is described in more detail with reference to FIG. 4.

Database 132 is a collection of source content 112 and source content metadata 114. Metadata 114 stored on database 132 may include but is not limited to metadata describing video segments concepts, styles, transcripts, objects, complexity scores, segment timestamp boundaries, and OCR text, obtained from processing source content 112 by non-linear video navigation program 134 or manual processing. Further, database 132 may also contain user profile data 136 and knowledge graphs. User profile data 136 may include any information about the user including, but not limited to the user's age, gender, education, learning preferences, and learning proficiency, etc. The knowledge graphs are data graphs comprised of nodes, i.e. different topics, and flows, i.e. relationships, between the nodes. The nodes and flows provide a map of the relationships between various pieces of data, such as, but not limited to, user profile data 136 and video content metadata. For example, an educational video may contain two topics, each having various subtopics. The knowledge graph may map each subtopic to a node and then identify the relationships, i.e. flows, between each subtopic. Further, the knowledge graph may be updated to include user profile data 136 and the video content metadata. For example, user profile data 136 may indicate a proficiency in one of the two topics presented in the video content. Thus, the knowledge graph may be updated to reflect what video content may be of interest to the user based on the user's proficiency. Knowledge graphs are described in more detail with reference to FIG. 3.

Non-linear video navigation program 134 is a program capable of enabling personalized, i.e. non-linear, navigation of source content 112 that has been collected from content device 110 and stored on database 132 on user device 120. Further, the non-linear navigation of source content 112 may be based on user profile data 136 and knowledge graphs stored on database 132.

Figure 2:
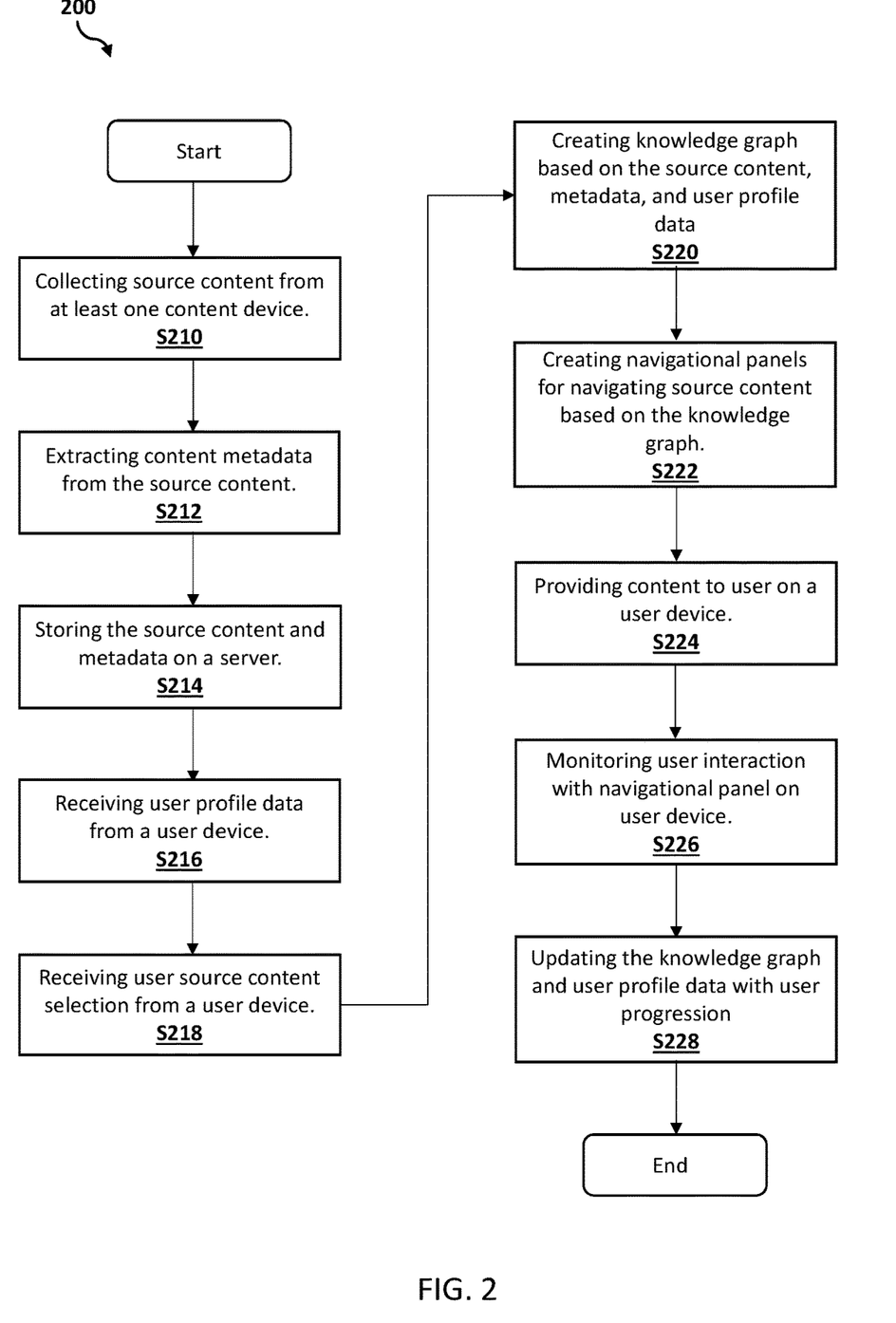
FIG. 2 is a flowchart illustrating an example method of non-linear video navigation, in accordance with an embodiment of the invention.

Referring to FIG. 2, a method 200 for non-linear video navigation, in accordance with an embodiment of the invention includes collecting source content at step S210, non-linear video navigation program 134 collects source content 112 from content device 110. Non-linear video navigation program 134 may collect source content 112 from one or more sources, or from one or more devices. For example, non-linear video navigation program 134 may collect source content 112 from one or more video databases including, but not limited to, Massive Open Online Course (MOOC) databases, online college course databases, educational video databases, professional training and education video databases, etc. In an alternative embodiment, source content 112 may be collected by server 130 and stored in database 132 and non-linear video navigation program 134 receives source content 112 from database 132.

Referring to step S212, non-linear video navigation program 134 extracts metadata 114 from source content 112. Non-linear video navigation program 134 may extract metadata 114 including, but not limited to, segment concepts, presentation styles, transcripts, objects recognized using image recognition, complexity scores, segment timestamp boundaries, OCR text, etc. Non-linear video navigation program 134 may extract metadata 114 from source content 112 using any conventional metadata extraction tools.

Referring to step S214, non-linear video navigation program 134 stores source content 112 and extracted metadata 114 of source content 112 on database 132.

Referring to step S216, non-linear video navigation program 134 receives user profile data 136. User profile data 136 may be inputted via a user interface 122 on a user device 120 by a user. User profile data 136 may include, but is not limited to, age, gender, education, and learning preferences, learning proficiency, etc.

Referring to step S218 non-linear video navigation program 134 receives the user's source content selection. The user may select a specific video from source content 112 or the user may enter a general topic into a search function on user interface 122 and be presented with several videos to choose from. For example, a user may type in a search term such as "patents" into user interface 122 and non-linear video navigation program 134 may search all source content 112 stored in database 132 and present the user with a list of all source content 112 pertaining to "patents."

Referring to step S220, non-linear video navigation program 134 maps the semantic data of source content 112 and user profile data 136 to a knowledge graph. Semantic data may include, but is not limited to, audio and textual data. Non-linear video navigation program 134 may use a variety of word embedding methods and algorithms including, but not limited to, methods and algorithms using recurrent neural networks (RNNs), long short term memory (LTSM), and/or gated recurrent networks (GRUs). Non-linear video navigation program 134 may utilize a neural network to map the semantic data to a knowledge graph including, but not limited to, word2vec and Global Vectors for Word Representation (GloVe) to embed the semantic data of source content 112 into vectors of real numbers. Word2vec may utilize either continuous bag-of-words (CBOW) architecture model or continuous skip-gram (C-SG) model architecture to embed the semantic data of source content 112. CBOW enables the prediction of a word based its surrounding words. C-SG enables the prediction of surrounding words based on a single word. The knowledge graph may consist of nodes and flows between the nodes, where each node represents a different topic contained within source content 112. For example, source content 112 may cover three distinct topics, non-linear video navigation program 134 would map the semantic data for each distinct topic to a single node. Non-linear video navigation program 134 may identify the relationships between the nodes based on the order or presentation within source content 112. Alternatively, non-linear video navigation program 134 may identify the relationships between the nodes based on the semantic data mapping. Further, the knowledge graph includes the mapped semantic data of user profile data 136; thus, the knowledge graph is specifically tailored to each individual user.

Referring to step S222, non-linear video navigation program 134 creates navigational panels on server 130 for source content 112 selected by the user based on the created knowledge graph. The navigational panels may include a table of contents of source content 112, timestamps of source content 112, a knowledge graph of concepts contained within source content 112, concept categories of source content 112, and details of the concepts contained within source content 112. The navigational panels are created using the meta-data extracted from source content 112 selected by the user and the knowledge graph. The navigational panels may be created using, but not limited to, the user's experience, and the user's preferred presentation style. For example, a user may select an educational video from source content 112 covering sections 35 U.S.C. §§ 101, 102, and 103 of the United States Patent Laws. However, the user's profile may indicate proficiency in 35 U.S.C. § 101 of the United States Patent Laws. Thus, non-linear video navigation program 134 may customize the navigational panels to skip all content pertaining to section 101. In an alternate embodiment, non-linear video navigation program 134 may grey out or otherwise distinguish concepts already mastered as indicated in the user's profile data; e.g. section 35 U.S.C. § 101 of the United State Patent Laws in the example above. The navigational panels may be displayed to the user via user interface 122 and allow the user to interact with source content 112 in a customized fashion. The navigational panels of non-linear video navigation program 134 are described in more detail with reference to FIG. 3.

Referring to step S224, non-linear video navigation program 134 sends the non-linear video navigational panels to user device 120 via network 140 to be displayed to the user on user interface 122.

Referring to step S226, non-linear video navigation program 134 monitors the user's actions on user device 120 and user interface 122. Non-linear video navigation program 134 may monitor a user's actions through the user's interactions with user device 120 and user interface 122. For example, non-linear video navigation program 134 may monitor the user's progression through source content 112. In an alternate embodiment, non-linear video navigation program 134 may monitor the user's actions using intuitive interfaces towards accessing within a video using eye-tracker. For example, non-linear video navigation program 134 may utilize eye tracking interfaces to monitor a user's interaction with and navigation of source content 112.

Referring to step S228, non-linear video navigation program 134 updates user profile data 136 and the knowledge graph based on the user's actions on user device 120 and user interface 122. For example, a user may have watched and completed a first segment of source content 112 selected by the user, non-linear video navigation program 134 may update user profile data 136 indicating proficiency in the subject area of first segment, which in turn updates the knowledge graph indicating the user's proficiency in that subject.

Figure 3:
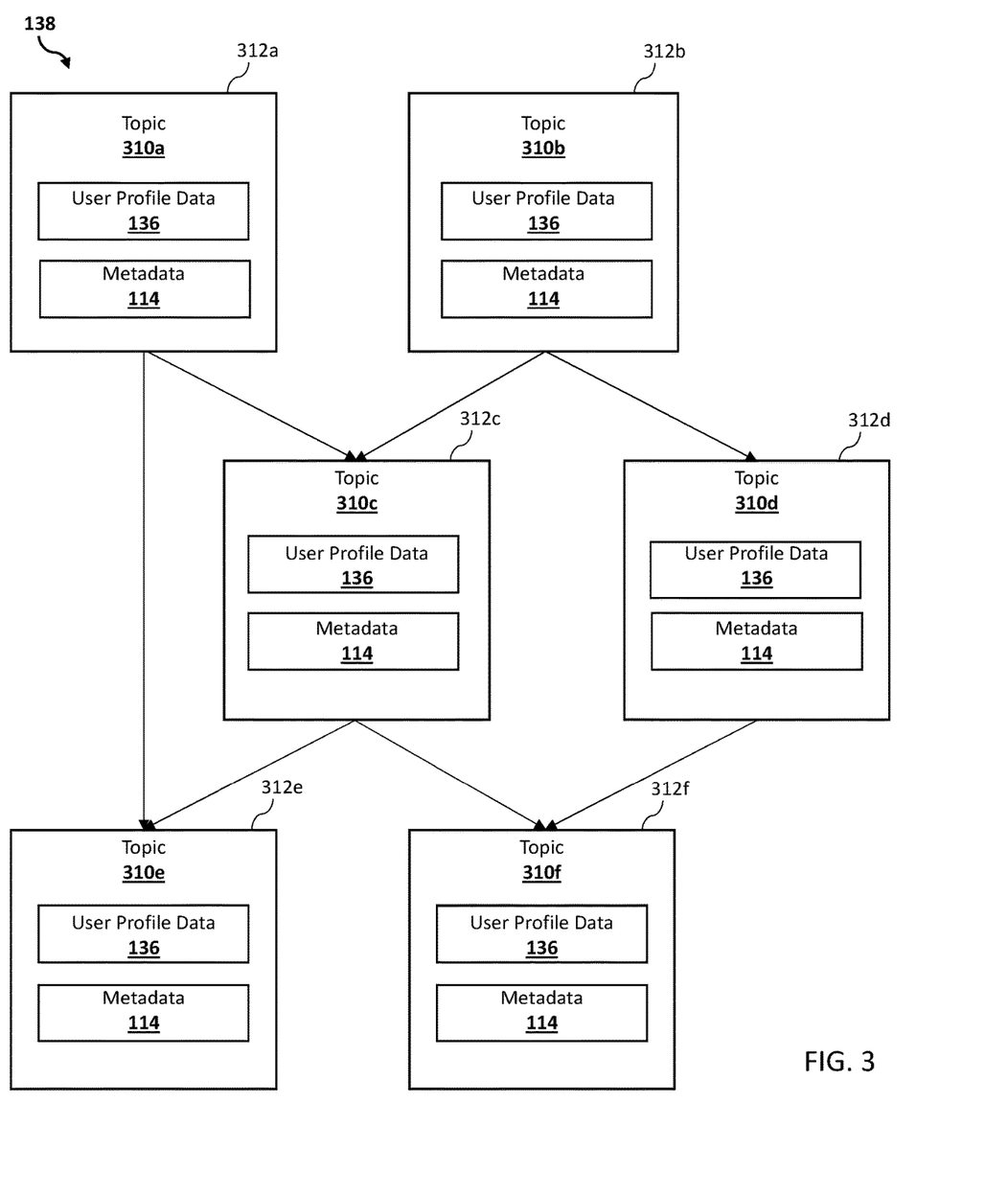
FIG. 3 is a block diagram which illustrates an example knowledge graph of the non-linear navigation system of FIG. 1, in accordance with an embodiment of the invention.

FIG. 3 illustrates an example knowledge graph 138, in accordance with the invention. Knowledge graph 138 may be data graphs comprised of nodes 312*a-f*, i.e. different topics, and flows, i.e. relationships, between the nodes. The nodes and flows provide a map of the relationships between various pieces of data, such as, but not limited to, user profile data 136 and video content metadata 114.

For example, knowledge graph 138 may be a data graph of an educational video containing topics 310*a-f*. Knowledge graph 138 may map each topic 310 to a node 312 and then identify the relationships, i.e. flows, between each subtopic. Further, knowledge graph 138 may include user profile data 136 and the metadata 114 relevant to each topic 310.

Figure 4:
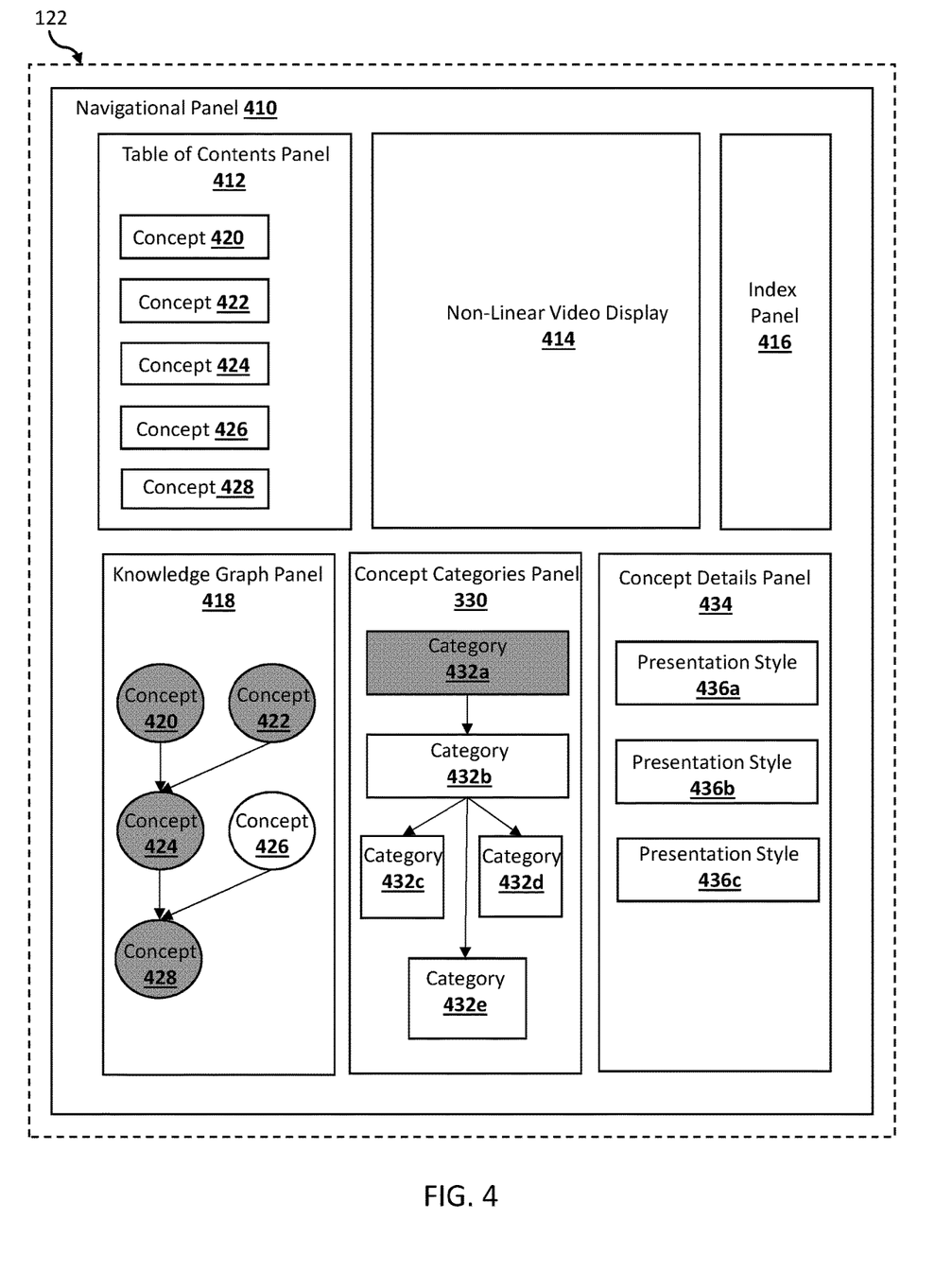
FIG. 4 is a block diagram which illustrates an example user interface of the non-linear video navigation system of FIG. 1, in accordance with an embodiment of the invention.

FIG. 4 illustrates an example navigational panel 410 of user interface 122, in accordance with the invention. Navigational panel 410 may be divided into table of contents panel 412, non-linear video display 414, index panel 416, knowledge graph panel 418, concept categories panel 430, and concept details panel 434.

For example, source content 112 selected by the user may cover concepts 420, 422, 424, 426, and 428. Non-linear video navigation program 134 may create navigational panel 410 having table of contents panel 412 showing the order in which concepts 420-428 appear in source content 112 selected by the user. In another embodiment, table of contents panel 412 may show time stamps and/or duration of each concept 420-428.

Navigational panel 410 may have non-linear video display 414, which displays to the user the selected portions of source content 112 selected by the user.

Navigational panel 410 may have index panel 416. Index panel 416 may contain a list of terms associated with concepts 420-428.

Navigational panel 410 may have knowledge graph panel 418 illustrating the mapped relationships between concepts 420-428 of source content 112 selected by the user. For example, concept 420 and concept 422 may be necessary to understand concept 424. Further, concept 424 and concept 426 may be necessary to understand concept 428. In an example embodiment of the invention, non-linear video navigation program 134 may determine that the user is proficient in, or has previously viewed, concepts 420, 422, and 424 based on user profile data 136 and customize navigational panel accordingly. In the example illustrated, non-linear video navigation program 134 may create navigational panel 410 so that the user would only see the portions of the source content 112 selected by the user associated with concept 426, with all other concepts greyed out or otherwise separated. It should be appreciated that while concepts 420-424, and 428 are greyed out, the user may still click on them via user interface 122 and navigate through those concepts.

Navigational panel 410 may have concept categories panel 430 illustrating how each concept 420-428 is structured within source content 112 selected by the user. Concept categories 432 may include, but are not limited to, an introduction, definitions, details, examples, and quizzes. For example, concept 426 of source content 112 selected by the user may contain concept categories 432a-e. In an example embodiment of the invention, non-linear video navigation program 134 may determine that the user is proficient in, or has previously viewed, concepts categories 432a based on user profile data 136 and customize navigational panel 410 accordingly. In the example illustrated, non-linear video navigation program 134 may create navigational panel 410 so that the user would only see the concept categories 432 of the source content 112 selected by the user not previously viewed or which the user is not proficient in, with all other concepts categories 432 are greyed out or otherwise separated. It should be appreciated that while concepts category 432a is greyed out, the user may still click on concept category 432a via user interface 122 and navigate through that concept category.

Navigational panel 410 may have concept details panel 434 illustrating the different presentation styles of source content 112 selected by the user. Source content 112 selected by the user may be presented in many ways including, but is not limited to, figures, written descriptions, examples, interactive questions, animations, etc. Concept details panel 434 allows a user to select their preferred presentation style 436 for source content 112 selected by the user so long as source content 112 selected by the user contains such presentation styling. For example, a user may indicate that their preferred presentation style 436 is interactive questions. Thus, non-linear video navigation program 134 may prioritize any interactive features of source content 112 selected by the user.

Figure 5:
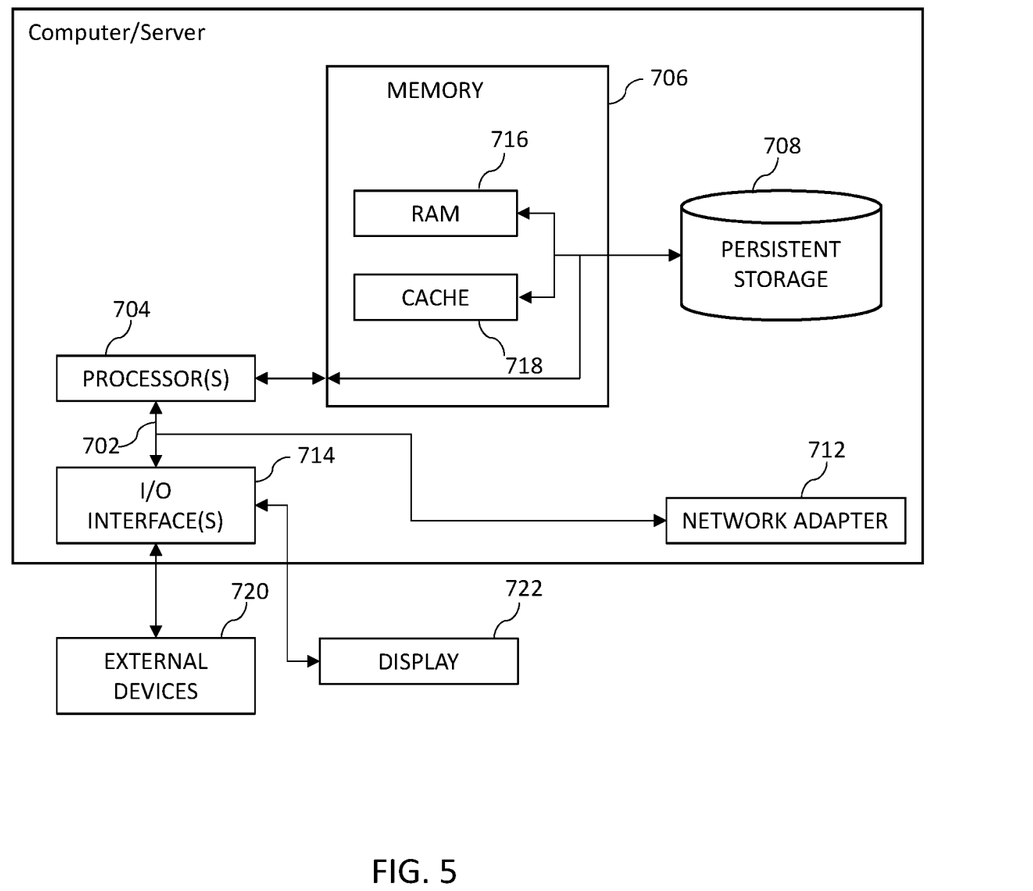
FIG. 5 is a block diagram depicting the hardware components of the non-linear video navigation system of FIG. 1, in accordance with an embodiment of the invention.

FIG. 5 depicts a block diagram of components of content device 110, user device 120, and server 130, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Content device 110, user device 120, and server 130 may include communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

The programs non-linear video navigation program 134 and database 132 in server 130; source content 112 in content device 110; and user interface 122 stored in user device 120 are stored in persistent storage 708 for execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links. The programs non-linear video navigation program 134 and database 132 in server 130; source content 112 in content device 110; and user interface 122 stored in user device 120 may be downloaded to persistent storage 708 through communications unit 712.

I/O interface(s) 714 allows for input and output of data with other devices that may be connected to server 130, content device 110 and user device 120. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention, e.g., the programs non-linear video navigation program 134 and database 132 in server 130; source content 112 in content device 110; and user interface 122 stored in user device 120, can be stored on such portable computer-readable storage media and can be loaded onto persistent storage 708 via I/O interface(s) 714. I/O interface(s) 714 can also connect to a display 722.

Display 722 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
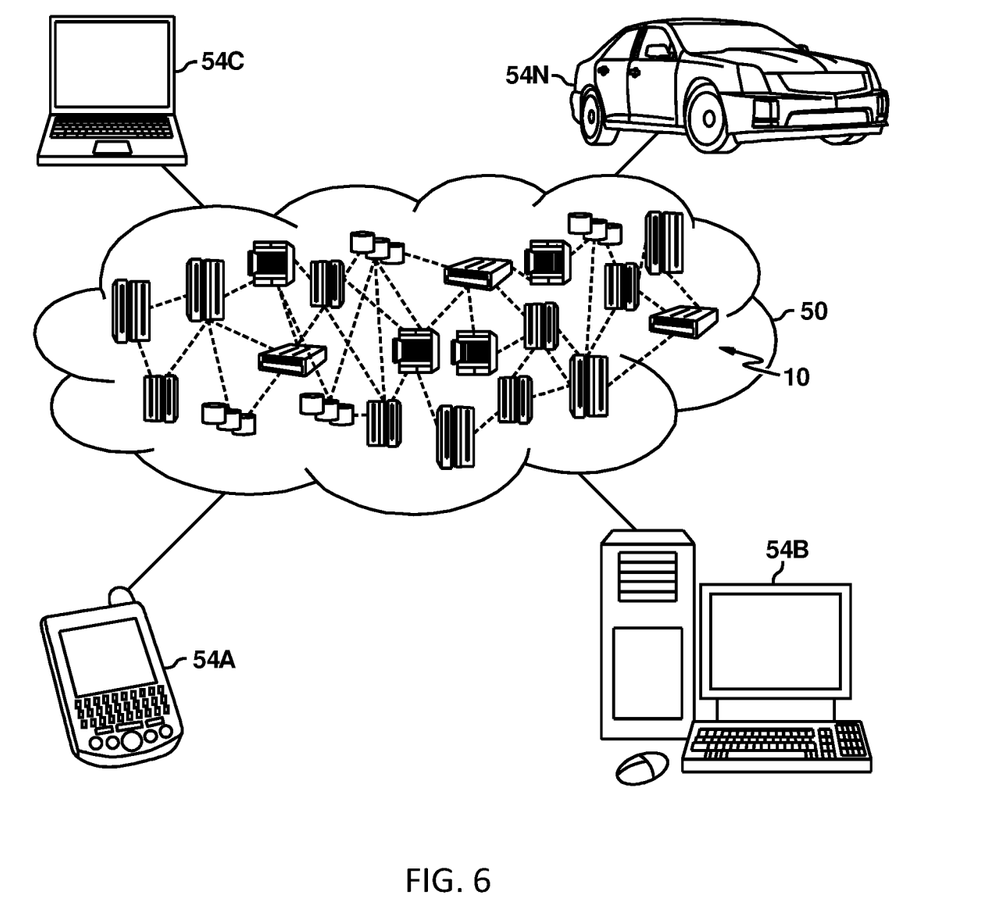
FIG. 6 illustrates a cloud computing environment, in accordance with an embodiment of the invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
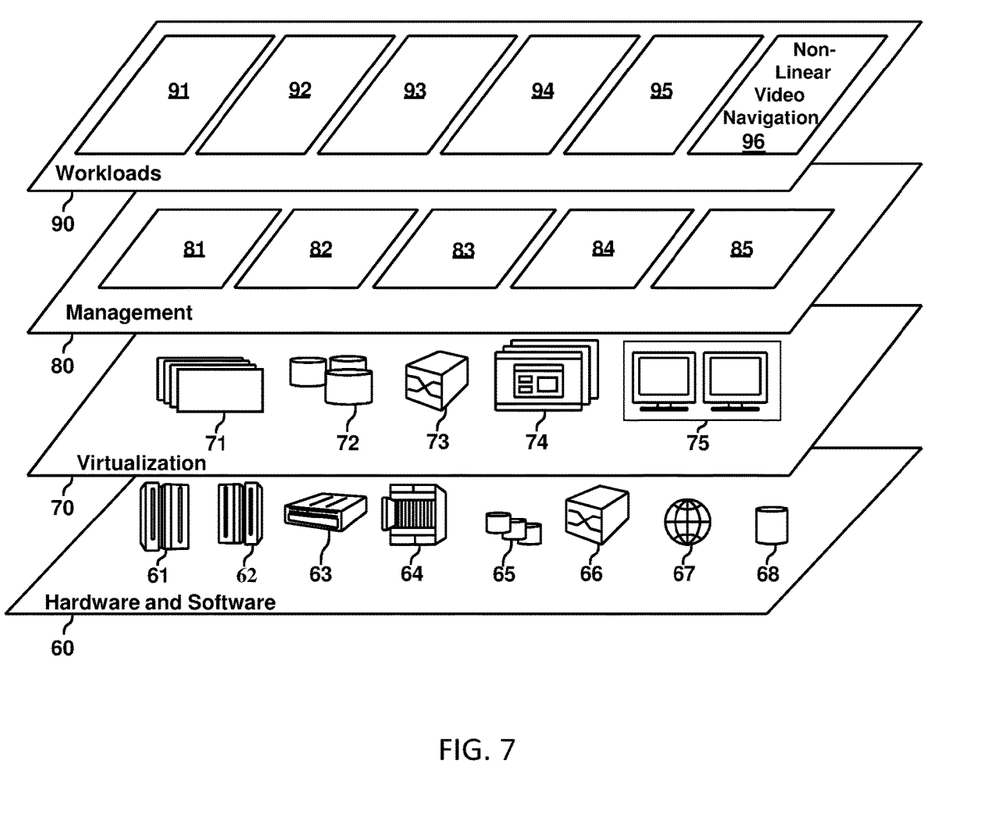
FIG. 7 illustrates a set of functional abstraction layers provided by the cloud computing environment of FIG. 6, in accordance with an embodiment of the invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and non-linear video navigation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for non-linear video navigation, the method comprising:

collecting source content, the source content containing one or more audiovisual files directed to one or more topics, wherein the one or more audiovisual files contains metadata, from at least one content device by a server communicating with the content device by a communication network;

the server extracting the metadata from the source content;

storing the source content and the metadata on the server;

receiving user profile data from at least one user device connected to the server by a communication network, the user profile data indicating user proficiency in the one or more topics of the one or more audiovisual files;

receiving a user selection of one of the one or more audiovisual files;

mapping semantic data of the selected audiovisual file, the metadata of the selected audiovisual file, and the user profile data to a knowledge graph, the knowledge graph mapping the one or more topics of the selected audiovisual file based on the user proficiency in the one or more topics of the selected audiovisual file, the one or more topics being associated with respective categories, the categories indicative of a structuring of the one or more topics in the selected audiovisual file;

creating a navigational panel for navigating the selected audiovisual file based on the knowledge graph, the navigational panel enabling non-linear navigation of the selected audiovisual file by the user, the created navigational panel being selected based on the user proficiency indicated in the user profile data, the created navigational panel including a knowledge graph panel and a concept categories panel, the created navigational panel being customized for the user by skipping select ones of the one or more topics and select ones of the categories associated with content already learned by the user as indicated in the user profile data, the knowledge graph panel showing a modified version of the knowledge graph by only showing remaining ones of the one or more topics via skipping the select ones of the one or more topics, the concept categories panel showing a modified version of the categories by only showing remaining ones of the categories via skipping the select ones of the categories;

providing the navigational panel to the user device by the server for navigation by the user;

monitoring the user's interaction with the navigational panel on the user device; and updating the knowledge graph and user profile data with the user's interaction with the navigational panel and progression through the selected audiovisual file.

2. The method of claim 1, wherein the user's interaction is monitored using an intuitive eye-tracking interface.

3. The method of claim 1, wherein the source content may comprise audio, visual and textual content.

4. The method of claim 1, wherein the knowledge graph comprises nodes and flows between the nodes, wherein the nodes comprise different source content topics and the flows represent the relationships between the different source content topics.

5. The method of claim 1, wherein the metadata comprises segment concepts, presentation styles, transcripts, objects recognized using image recognition, complexity scores, segment timestamp boundaries, and text obtained using optical character recognition (OCR).

6. The method of claim 1, wherein the semantic data of the source content is mapped using a neural network.

7. A computer program product for non-linear video navigation, the computer program product comprising:

a computer-readable storage medium and program instructions stored on the computer-readable storage medium, the program instructions comprising:

program instructions to collect source content, the source content containing one or more audiovisual files directed to one or more topics, wherein the one or more audiovisual files contains metadata, from at least one content device by a server communicating with the content device by a communication network;

program instructions to extract the metadata from the source content by the server;

program instructions to store the source content and the metadata on the server;

program instructions to receive user profile data from at least one user device connected to the server by a communication network, the user profile data indicating user proficiency in the one or more topics of the one or more audiovisual files;

program instructions to receive a user selection of one of the one or more audiovisual files;

program instructions to map semantic data of the selected audiovisual file, the metadata of the selected audiovisual file, and the user profile data to a knowledge graph, the knowledge graph mapping the one or more topics of the selected audiovisual file based on the user proficiency in the one or more topics of the selected audiovisual file the one or more topics being associated with respective categories, the categories indicative of a structuring of the one or more topics in the selected audiovisual file;

program instructions to create a navigational panel for navigating the selected audiovisual file based on the knowledge graph, the navigational panel enabling non-linear navigation of the selected audiovisual file by the user, the created navigational panel being selected based on the user proficiency indicated in the user profile data, the created navigational panel including a knowledge graph panel and a concept categories panel, the created navigational panel being customized for the user by skipping select ones of the one or more topics and select ones of the categories associated with content already learned by the user as indicated in the user profile data, the knowledge graph panel showing a modified version of the knowledge graph by only showing remaining ones of the one or more topics via skipping the select ones of the one or more topics, the concept categories panel showing a modified version of the categories by only showing remaining ones of the categories via skipping the select ones of the categories;

program instructions to provide the navigational panel to the user device by the server for navigation by the user;

program instructions to monitor the user's interaction with the navigational panel on the user device; and  program instructions to update the knowledge graph and user profile data with the user's interaction with the navigational panel and progression through the selected audiovisual file.

8. The method of claim 1, wherein the one or more audiovisual files comprise one or more educational course data files.

9. The computer program product of claim 7, wherein the user's interaction is monitored using an intuitive eye-tracking interface.

10. The computer program product of claim 7, wherein the source content may comprise audio, visual and textual content.

11. The computer program product of claim 7, wherein the knowledge graph comprises nodes and flows between the nodes, wherein the nodes comprise different source content topics and the flows represent the relationships between the different source content topics.

12. The computer program product of claim 7, wherein the metadata comprises segment concepts, presentation styles, transcripts, objects recognized using image recognition, complexity scores, segment timestamp boundaries, and text obtained using optical character recognition (OCR).

13. The computer program product of claim 7, wherein the semantic data of the source content is mapped using a neural network.

14. The computer program product of claim 7, wherein the one or more audiovisual files comprise one or more educational course data files.

15. A computer system for human-machine communication, the computer system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to collect source content, the source content containing one or more audiovisual files directed to one or more topics, wherein the one or more audiovisual files contains metadata, from at least one content device by a server communicating with the content device by a communication network;

program instructions to extract the metadata from the source content by the server;

program instructions to store the source content and the metadata on the server;

program instructions to receive user profile data from at least one user device connected to the server by a communication network, the user profile data indicating user proficiency in the one or more topics of the one or more audiovisual files;

program instructions to receive a user selection of one of the one or more audiovisual files;

program instructions to map semantic data of the selected audiovisual file, the metadata of the selected audiovisual file, and the user profile data to a knowledge graph, the knowledge graph mapping the one or more topics of the selected audiovisual file based on the user proficiency in the one or more topics of the selected audiovisual file the one or more topics being associated with respective categories, the categories indicative of a structuring of the one or more topics in the selected audiovisual file;

program instructions to create a navigational panel for navigating the selected audiovisual file based on the knowledge graph, the navigational panel enabling non-linear navigation of the selected audiovisual file by the user, the created navigational panel being selected based on the user proficiency indicated in the user profile data, the created navigational panel including a knowledge graph panel and a concept categories panel, the created navigational panel being customized for the user by skipping select ones of the one or more topics and select ones of the categories associated with content already learned by the user as indicated in the user profile data, the knowledge graph panel showing a modified version of the knowledge graph by only showing remaining ones of the one or more topics via skipping the select ones of the one or more topics, the concept categories panel showing a modified version of the categories by only showing remaining ones of the categories via skipping the select ones of the categories;

program instructions to provide the navigational panel to the user device by the server for navigation by the user;

program instructions to monitor the user's interaction with the navigational panel on the user device; and program instructions to update the knowledge graph and user profile data with the user's interaction with the navigational panel and progression through the selected audiovisual file.

16. The computer system of claim 15, wherein the user's interaction is monitored using an intuitive eye-tracking interface.

17. The computer system of claim 15, wherein the source content may comprise audio, visual and textual content.

18. The computer system of claim 15, wherein the knowledge graph comprises nodes and flows between the nodes, wherein the nodes comprise different source content topics and the flows represent the relationships between the different source content topics.

19. The computer system of claim 15, wherein the metadata comprises segment concepts, presentation styles, transcripts, objects recognized using image recognition, complexity scores, segment timestamp boundaries, and text obtained using optical character recognition (OCR).

20. The computer system of claim 15, wherein the one or more audiovisual files comprise one or more educational course data files.

* * * * *